Patented Jan. 29, 1924.

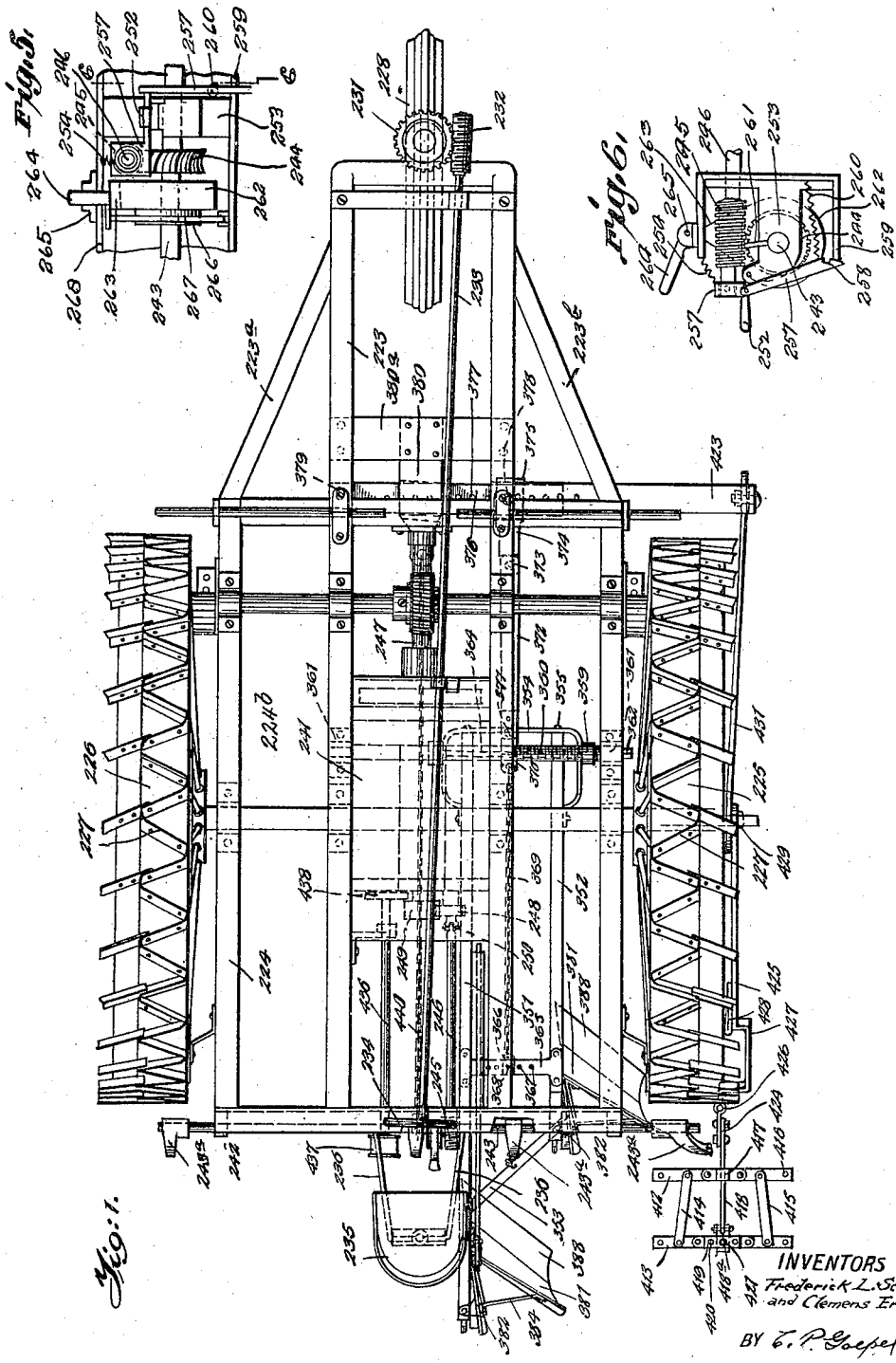

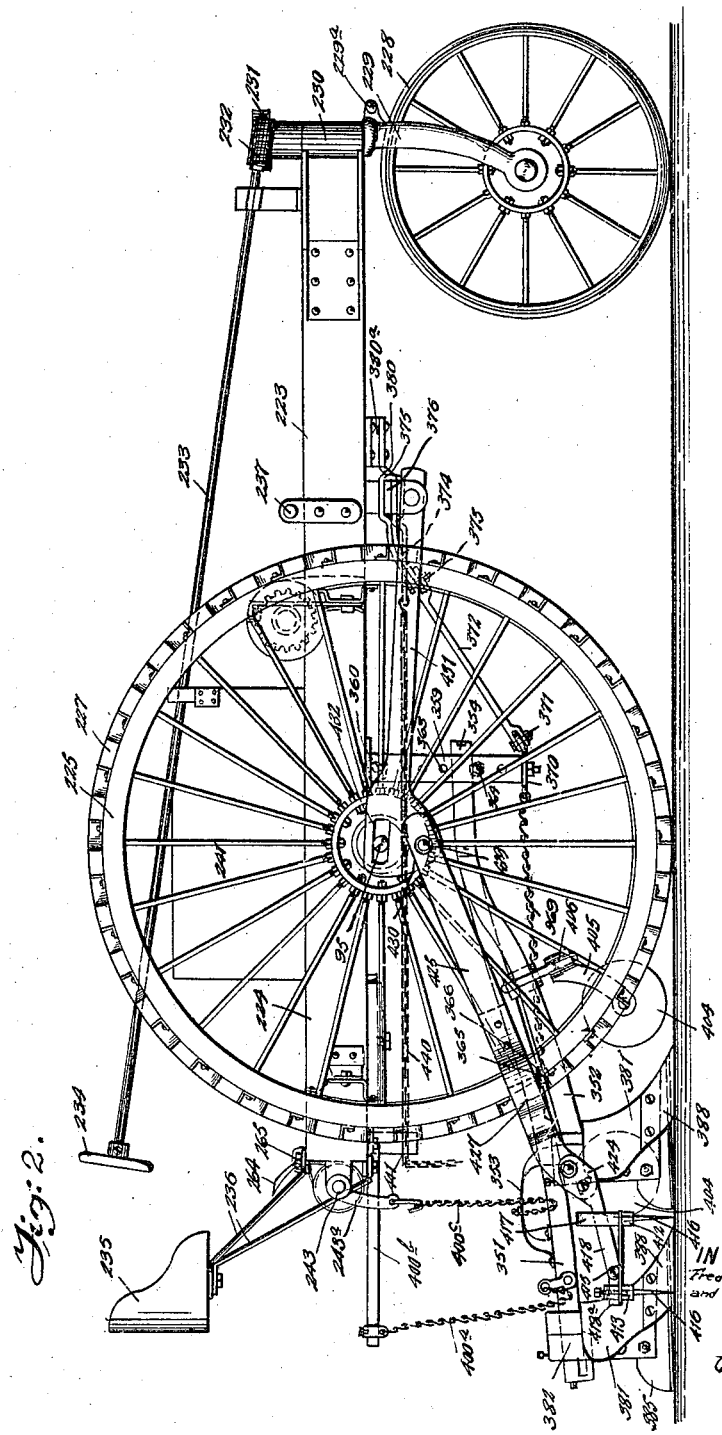

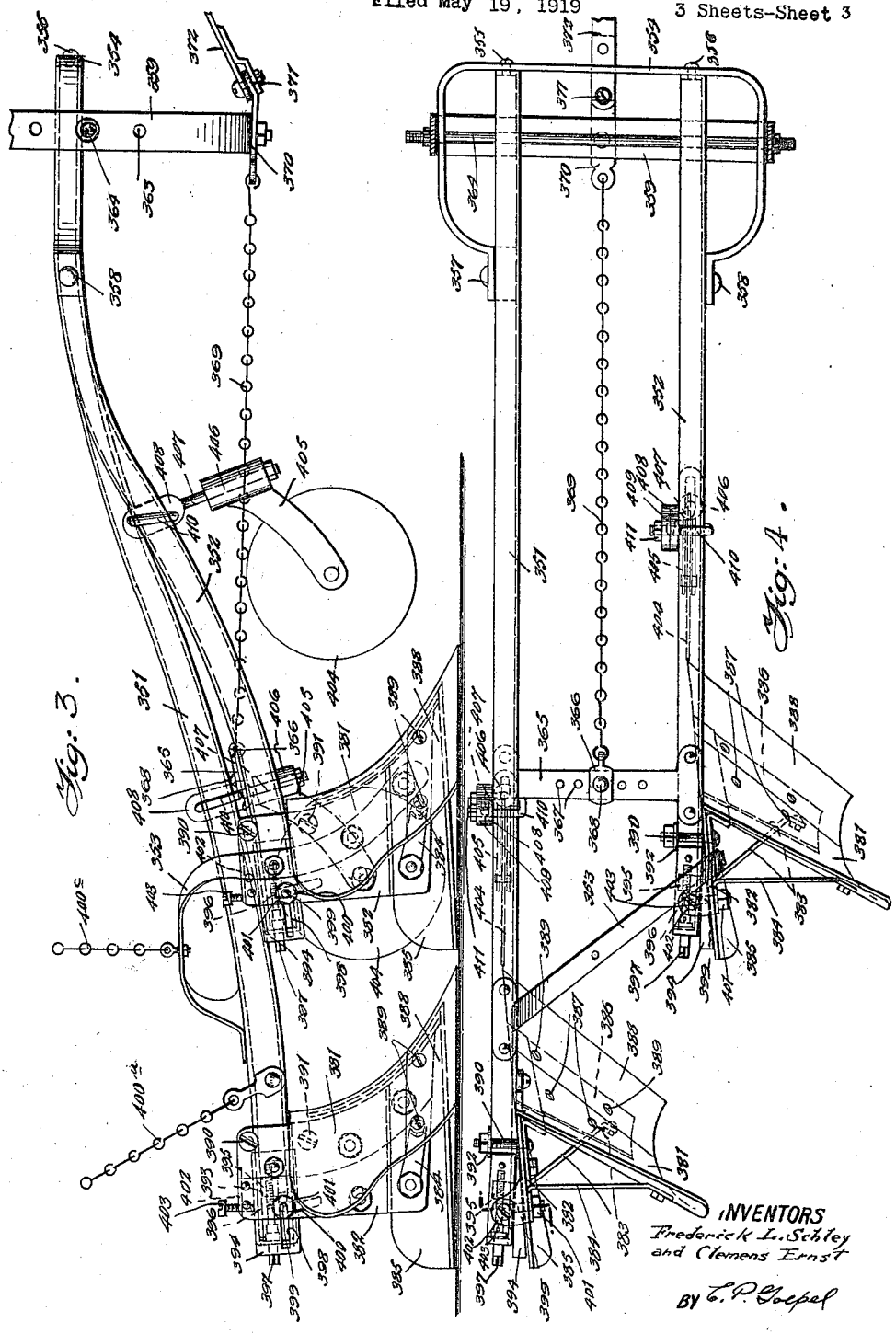

1,482,266

UNITED STATES PATENT OFFICE.

FREDERICK L. SCHLEY AND CLEMENS ERNST, OF BROOKLYN, NEW YORK.

MOTOR-DRIVEN AGRICULTURAL MACHINERY.

Application filed May 19, 1919. Serial No. 298,159.

*To all whom it may concern:*

Be it known that we, FREDERICK L. SCHLEY and CLEMENS ERNST, citizens of the United States, and residents of the borough of Brooklyn, county of Kings, city and State of New York, have invented certain new and useful Improvements in Motor-Driven Agricultural Machinery, of which the following is a specification.

The present invention relates to improvements in motor driven agricultural machinery, and more particularly a power driven tractor and plows, harrows, cultivators, etc., adapted to be used in connection therewith. We propose especially to provide a machine of this character that will meet the various conditions and necessities of farming in a more efficient manner than has heretofore been possible with machinery intended for this purpose. An object is to provide a machine with which one man may control the engine, the implements and all the necessary operations involved in using the machine and in a manner that will enable him at all times to see the work being done and thereby accurately guide and control the course and actions of the implements. To this end, we propose to so place and support the implements that the pulling force of the tractor will be resolved into a digging or other needed force to cause the implements to engage the earth in a way to produce the most advantageous results.

A further object is to provide a tractor capable of both light and heavy work, as for instance cultivating and plowing, this result being brought about by means of weighting means and auxiliary wheel rims, so that with the one machine the farmer will have all the benefits of both a light and heavy tractor.

We further propose to provide for the complete adjustment of the various implements so that they may be adapted to any conditions of service, and also to provide elevating means adapted to automatically raise the implements when desired, and further we propose a machine which may be turned or backed up with facility while the implements are attached.

A still further object is to provide a machine capable of great flexibility of movement, permitting of backing, turning, etc., within a very small compass so that the machine will have adaptation to conditions where close work is required as for instance, work in an orchard or close to a fence or corner.

In connection with the tractor wheels, we propose to provide a construction which is simple, strong and in which power is applied interiorly to the rim. The tread means will be such that a firm grip upon the ground will be had but at the same time the earth will be immediately freed of the wheel and will therefore not clog the same.

In particular we propose to provide in the present embodiment a continuous zig-zag tread which will serve as a road band on a hard road, and when cultivating in soft ground will act as a chopper cutting up lumps wherever the wheels may strike.

We finally propose to provide a machine of economical and durable construction capable of meeting practically all the needs of farming, and of such construction that worn or broken parts may be readily repaired and replaced by the farmer or by the blacksmith without the necessity of getting parts from the manufacturer, with the consequent delay and loss of use of the machine.

With the above and other objects in view, embodiments of our invention are shown in the accompanying drawings, and these embodiments will be hereinafter more fully described with reference thereto and the invention will be finally pointed out in the claims.

In the accompanying drawings:

Figure 1 is a plan view of an embodiment of the invention.

Figure 2 is a side elevation of Figure 1.

Figure 3 is a detail side elevation of the plow.

Figure 4 is a plan view thereof.

Fig. 5 is a detail horizontal sectional view, showing a form of raising and lowering mechanism employed, and Fig. 6 is a vertical sectional view thereof taken along the line 6—6 of Fig. 5.

Similar reference characters indicate corresponding parts throughout the several figures of the drawings.

In Figures 1 to 4, we have illustrated a form of the invention in which the extension 223 of the main frame 224 extends forwardly thereof. Triangular spaces are formed at each side of the portion 223 by side brace pieces 223ª and 223ᵇ, these spaces forming space for tools, weights or the like and are disposed forwardly of the oblong spaces 224ᵇ on the side portions of the main frame. Said pockets being provided for the reception of weights and the like. The side wheels 225 and 226 are peripherally provided with ground gripping teeth 227. The small forward guide wheel 228 is mounted in a forked member 229 journaled in a bearing 230 secured to the front end of the frame, a worm gear 231 being provided upon the upper end of the forked member which is engaged by a worm 232 mounted upon the end of a steering rod 233 extending to the rear of the machine, a steering wheel 234 being provided upon its rear end in front of the driver's seat 235, mounted upon spring supporting bars 236 secured to the rear of the frame. At the upper end of the fork 229 there is provided a pin 229ᵃ projecting at each side thereof and upon which is engaged the upper apertured end 228ᵃ of the guard 228ᵇ embracing the front portion of the wheel 228, the said guard being formed of two parts bolted together and provided with a forward leading edge 228ᶜ and at its lower end with a deflecting nose 228ᵈ. A frame portion 228ᵉ extends from the lower end of each side of the guard 228ᵇ and is bent upwardly as at 288ᶠ terminating in an apertured end portion 228ᵍ engaging the ends of the wheel axle. The space within the guard is filled with a canvas filler 228ʰ in a similar manner to the guards provided upon the side wheels, being connected thereto and held taut by a plurality of hooked springs 288ⁱ. At the forward end of the main portion of the frame there are provided slide bars 237 for supporting the side wheel guards 238 which are of similar form to those described with reference to the first embodiment of our invention. The side wheels are driven by the driving pinion gears 239 mounted upon the driving shafts 240 driven from the main driving shaft of the engine 241.

At the rear of the frame there is mounted in bearings 242 a shaft 243 provided at suitable intervals with lifting arms 243ᵃ adapted upon rotation of the shaft to raise and lower the implements connected thereto, as will be hereinafter more fully pointed out.

The shaft 243 may be operated by any suitable means as the worm gear 244 provided upon the shaft 243 and which is engaged at its upper side by a worm 245 provided upon a shaft 246 driven from the main driving shaft 247 by means of intermeshing pinions 248 and 249 and provided with a universal joint 250 adjacent the pinion 248. The forward end of this shaft 246 is journaled in an extension 251 of a foot lever 252 mounted in a bracket 253 secured to the frame. The shaft 246 is held normally raised by means of a spring 254, and a pawl 257 is provided upon the foot lever, and as the said lever is depressed to engage the worm with the worm gear, the notch 258 of the pawl is hooked into the edge 259 of the frame to retain the worm in engagement, a spring 260 yieldably holding the pawl in engagement with the edge 259. A pin 261 provided upon the shaft 243, engages the pawl as it completes its turning movement through a predetermined degree, disengaging the same from the edge 259 and allowing the worm to be moved by the spring 254 out of engagement with the worm gear. A band brake drum 262 is provided upon the shaft 243, the band 263 thereof being operated by means of a foot lever 264 mounted in a bracket 265. At the side of the drum 262 there are provided a ratchet 266 mounted upon the shaft 243 and a pawl 267 to retain the position of the shaft 243 as it is turned, the pawl adapted to be thrown out of engagement with the ratchet upon operation of the brake to permit return movement of the shaft and lowering of the implements by means of a cam surface 268 provided upon the said lever 264.

The plows shown in Figures 3 to 4 are provided upon the ends of beams 351 and 352 being disposed one in front of the other and offset in the usual manner, the beams being connected at their rear end portions by a diagonal connecting bar 353, while at their forward ends they are connected by a frame 354 bolted at 355 and 358 to the sides of the beams. A U-shaped swinging frame 359 is supported at the under side of the tractor frame upon a screw threaded transverse shaft 360 journaled in bearings 361 of the frame, and provided with a squared projecting end 262 to enable turning of the shaft by means of a suitable wrench, turning of the shaft adapted to shift the frame 359 transversely. A series of holes 363 are provided in the upright sides of the frame 359 in which is secured a transverse supporting bar 364, adjustment of this bar as to height being permitted by means of the holes 363. The forward ends of the beams and the frame 354 rest upon this bar 364, the relatively greater width of the frame 354 being sufficient to prevent tipping, and maintain the plows level, the side portions of the frame 354 engaging the inner sides of the frame 359 to limit the side movement thereof.

A crossbar 365 extends between the beams directly in front of the forward plow, and is provided with a swivel member 366 adapted to be connected to one of the several holes 367 by means of a bolt 368, and to which one end of a pull chain 369 is connected, the other end being connected to the apertured end of a pivoted member 370 provided upon the lower side of the frame 359. Several such chains may if desired be connected to the crossbar 365, or to the beams in proximity thereto. The other end of this member 370 is pivotally connected at 371 to one end of a connecting bar 372 pivotally connected at its other end 373 to a member 374 having a sleeve portion 375 adjustably mounted upon a transverse bar 376, adjustment being afforded by means of a series of holes 377 provided in the said bar to any one of which the said member may be connected by a bolt 378. In the form shown in Figure 3, the bar 372 is substituted by a pull chain 372ª, extending to the forward end of the frame and substantially centrally thereof.

The said bar is pivoted at its inner end 379 upon the frame, and passes through a looped extension 380 of a crosspiece 380ª, bolted to the frame of the tractor and disposed substantially centrally thereof. By this manner of connecting the plows to the tractor, the pulling force of the tractor is transmitted from the central line of the same to the plows so that the digging force of the plows which is at one side of the center line will not cause the tractor to be swerved out of its path, but due to the central pulling, the tractor will at all times maintain a straight course. The chain connection below the point of support of the beams, causes the pulling force to be resolved into a digging force upon the plows and by raising and lowering the bar supporting the beams, this digging action may be regulated as desired. The digging action is proportionate to the pulling power of the tractor. The tractor is furthermore held to the ground, that is, the drag of the plows will tend to hold its guide wheel down rather than to force it upwardly so that an increase in the resistance from the plows will cause the tractor to more firmly grip the ground, so that the full pulling effect of the tractor is utilized and no loss of power results.

The plows themselves are adjustable upon the beams both as to depth and inclination. The two plows are identical so that a detail description of one will suffice. The plow comprises a moldboard 381 supported upon an upright standard 382 being braced by trusses 383 and 384, a landside member 385 being secured to the lower end of the standard 382. A projecting backing plate 386 is secured to the rear side of the moldboard by bolts 387, the plow share 388 being connected to the projecting portion of the plate 386 by bolts 389, the plow share being removable to permit of its replacement when it becomes worn. The standard is clamped at one side of the beam by means of bolts 390 and 391 extending above and below the same, and passing through the ends of a clamping plate 392 disposed at the other side of the beam, this connection permitting swinging movement of the plow to a limited degree both in a vertical and lateral plane. The end of the beam is provided with a slot 393 and between the beam and the standard there is provided a wedge-shaped member 394, having a projecting block 395 extending through the slot and engaged by a screw 396 journaled in the end of the beam, and provided with a squared extension 397 adapted to be engaged by a suitable wrench to turn the same to cause the wedge-shaped member 394 to be moved and thereby causing the plow to be turned to change its inclination laterally. A slot 398 is provided in the wedge through which a stud 399 fixed in the beam extends through an arcuate slot 400 provided in the standard, a nut 401 being provided on the end of the stud 399 which is adapted to be tightened against the standard to fix its position. At the upper end of the standard there is provided an outwardly bent portion 402 projecting over the end of the beam, a set screw 403 being provided therein which bears upon the beam, and which upon loosening of the nut 401, may be adjusted to turn the plow share in a vertical plane. Thus the point of the plow share and the inclination of the plow may be accurately regulated. As the plow share becomes worn away, the change in the position of its point may be accurately compensated for, the point by adjustment being brought to its proper working position. The plow share may therefore be used until it becomes practically worn away. A chain 400ª extends from the rear of the plow beams to a point of the tractor frame rearwardly thereof, this point in the form shown in Figure 19 being provided by means of an extension rod 400ᵇ. During backing of the tractor, this chain causes the plow to be backed also, preventing the same from coming into contact with the wheels.

Coulter disks 404 are disposed in front of the plows, being rotatable in bearing supports 405 pivotally mounted at 406 upon crank arms 407, pivotal between plates 408 and 409, clamped to the beam by means of a U-shaped clamping bar 410 embracing the beam, the threaded ends of the bar 410 passing through the plates 408 and 409 and being provided with nuts 411 for tightening the same. By changing the position of the crank arms, the coulter disk may be accurately positioned relatively to the point of the plow share. The plows may be raised and lowered by means of a chain 400ᶜ secured at one end to the crosspiece 353 and at its other end to one of the lifting arms. The plows being entirely at one side of the beams, a freeway is provided above the moldboard for the passage of the turned ground. The beams may therefore be set very low making a more rigid plow, and obviating the yield that occurs in a high arched beam.

During plowing, we may also attach a harrow to the tractor to pass over the ground after it is plowed, although it will be understood that these two operations are not of necessity carried out together and the plows as also the harrows may be used independently.

The harrow shown in Figures 1 and 2 comprises a frame of substantially trapezoidal shape, the parallel bars 412 and 413 of which are square and tubular in cross section, pivotally connected to the non-parallel bars 414 and 415.

Spikes 416, or other suitable ground engaging means such as disks, are mounted in the bars 412 and 413, and at the upper side of the bar 413 there is mounted an upstanding yoke 417 through which an arm 418 extends from a block member 418ª hingedly connected thereto and disposed beneath a strap 419 secured to the upper side of the bar 413 and provided with a plurality of holes 420 to any one of which the block may be connected by means of a bolt 421, the bar 413 is adapted to be shifted to either side by means of the pivotal connecting bars 414 and 415. The yoke 417 is provided with a plurality of holes 422 to any one of which the arm 418 may be connected by a bolt 423, thereby permitting adjustment of the angle of the harrow frame relatively to the said arm 418. The arm 418 is enlarged as at 424 and is secured to the end of a bar 425 hinged at 426 adjacent the connection, the same being bent outwardly as at 427 to embrace the projecting tread teeth of the tractor wheel, and provided with a plate 428 secured thereto and adapted to engage the side of the tractor wheel rim. At its upper end, the bar 425 is pivotally connected at 429 to the depending portion 430 of the bar 431, having an elongated slot 432 engaging the projecting end 95 of the axle shaft, and extending forwardly to a slide rod 423 to which it is pivotally connected, the said slide rod being slidably secured to the under side of the transverse bar 376 by the looped portion 375 of the member 374. When in use, this rod 423 may be projected beyond the wheel rim so as to be engaged by the bar 431, while at other times, it is slid beneath the frame out of the way. By the connection of the harrow to the bar 376, the pulling force of the tractor is transmitted from the center line there in a substantially similar manner to the pulling action upon the plows. The hinge 426 permits the harrow to have a free vibrating movement, so that it most effectually engages the ground, while riding thereover.

Our invention provides an arrgricultural machine suited to the requirements of farming. It is of light weight, and at the same time capable of withstanding the rough usage of farming. The various implements may be connected with facility and when not in use will occupy very little space, a feature of no little importance, and the adjustability of the implements enables their use for various farming operations which would otherwise necessitate the provision of separate implements. Thus the cultivators may be adapted to cultivating between rows of various widths.

The manner of supporting the plows does away with the necessity of guide wheels as has been necessary heretofore, the plows maintaining a straight course without these. The plow shares may be used until they practically become worn away and the adjustment afforded enables them to be accurately positioned.

We have illustrated and described preferred and satisfactory embodiments of our invention, but it is obvious that changes may be made therein within the spirit and scope thereof as defined in the appended claims.

We claim:

1. In a machine of the character described, a frame, a transverse axle having projecting wheel spindles at each side of said frame, and shaft extensions on said spindles, a pair of side wheels mounted on said spindles, a guide wheel, ground engaging implements disposed to the rear of said axle, a draft bar located on the outside of one of said wheels, and provided with an elongated slot engaging the end of one of said spindles said spindle, and a bar pivotally connected at one end of said slotted bar and at the other end to said ground engaging members.

2. In a machine of the character described, a frame, a transverse axle having projecting wheel spindles at each side of said frame, and shaft extensions on said spindles, a pair of side wheels mounted on said spindles, a guide wheel, ground engaging implements disposed to the rear of said axle, a draft bar located on the outside of one of said wheels, and provided with an elongated slot engaging the end of one of said spindles, and a bar pivotally connected at one end to said slotted bar and having its other end offset and pivotally connected with said ground engaging implements.

3. In a machine of the character described, a main frame, a transverse axle having projecting wheel spindles at each side of said frame, a pair of side wheels mounted on said spindles, a guide wheel, a suspended frame at the under side of said main frame, a crossbar disposed in said supended frame adjustable as to height, ground working implements disposed beneath said main frame and having beams disposed in said suspended frame and resting on said crossbar, a pull connection extending from said beams at a point substantially at the rear ends thereof to the lower ends of said suspended frame, and means connecting said suspended frame to said main frame.

4. In a machine of the character described, a main frame, a transverse axle having projecting wheel spindles at each side of said frame, and a pair of side wheels mounted on said spindles, a guide wheel, a suspended frame at the under side of said main frame, transversely of said main frame, ground working implements disposed beneath said main frame, and having beams disposed in said suspended frame, a pull connection extending from said beams at a point substantially toward the rear end thereof to the lower end of said suspended frame, and means connecting said suspended frame to said main frame.

5. In a machine of the character described, a main frame, a transverse axle having projecting wheel spindles at each side of said frame, a pair of side wheels mounted on said spindles, a guide wheel, a suspended frame at the under side of said main frame, ground working implements disposed beneath said main frame and having beams disposed in said suspended frame, a pull connection extending from said beams at a point substantially toward the rear ends thereof to the lower end of said suspended frame beneath the point of support of said beams thereon, a fixture on said main frame disposed substantially centrally thereof and forwardly of said suspended frame, and means connecting said suspended frame to said main frame.

6. In a machine of the character described, a main frame, a transverse axle having projecting wheel spindles at each side of said main frame, a pair of side wheels mounted on said spindles, a guide wheel, a suspended frame on the under side of said main frame disposed at one side of the center line of said main frame, ground working implements disposed beneath said main frame at one side of the center line thereof, and having beams disposed in said suspended frame, a pull connection extending from said beams at a point substantially toward the rear end thereof to the lower end of said suspended frame, a fixture on said main frame disposed substantially centrally thereof and forwardly of said suspended frame, and means connecting said suspended frame to said main frame.

7. In a machine of the character decribeds, a main frame, a transverse axle having projecting wheel spindles at each side of said main frame, a pair of side wheels mounted on said spindles, a guide wheel, a suspended frame on the under side of said main frame disposed at one side of the center line of said main frame, ground working implements disposed beneath said main frame at one side of the center line thereof, and having beams disposed in said suspended frame, a pull connection extending from said beams at a point substantially toward the rear end thereof to the lower end of said suspended frame, a fixture on said main frame disposed substantially centrally thereof and forwardly of said suspended frame, a transverse bar pivotally connected to said main frame at one side of said fixture, said bar engaging said fixture and projecting at the other side thereof, and a pull member extending from said projecting bar to said suspended frame.

8. In a machine of the character described, a main frame, a transverse axle having projecting wheel spindles at each side of said main frame, a pair of side wheels mounted on said spindles, a guide wheel, a suspended frame on the under side of said main frame disposed at one side of the center line of said main frame, ground working implements disposed beneath said main frame at one side of the center line thereof, and having beams disposed in said suspended frame, a pull connection extending from said beams at a point substantially toward the rear end thereof to the lower end of said suspended frame, a fixture on said main frame disposed substantially centrally thereof and forwardly of said suspended frame, a transverse bar pivotally connected to said main frame at one side of said fixture, said bar engaging said fixture and projecting at the other side thereof, and a pull member extending from said projecting bar to said suspended frame, the connection of said pull member with said transverse bar being adjustable transversely of the main frame.

9. In a machine of the character described, a main frame, a transverse axle having projecting wheel spindles at each side of said frame, a pair of side wheels mounted on said spindles, a guide wheel, a suspended frame at the under side of said main frame, ground working implements disposed beneath said main frame and having beams disposed in said suspended frame, a pull connection extending from said beams substantially toward the rear end thereof to a point of said main frame substantially forwardly of said suspended frame.

10. In a machine of the character described, a main frame, a transverse axle having projecting wheel spindles at each side of said frame, a pair of side wheels mounted on said spindles, a guide wheel, a suspended frame at the under side of said main frame, ground working implements disposed beneath said main frame and having beams disposed in said suspended frame, a pull connection extending between said beams substantially toward the rear end thereof to a point of said main frame substantially forwardly of said suspended frame and adapted to pull the ground working implements forwardly upon forward movement of said main frame, and a pull connection extending from the rear end of said beams to a point of said main frame rearwardly thereof and adapted to pull said ground working implements rearwardly upon said rearward movement of said main frame.

11. In a machine of the character described, a main frame, a transverse axle having projecting wheel spindles at each side of said main frame, a pair of side wheels mounted on said spindles, a guide wheel, a suspended frame on the under side of said main frame disposed at one side of the center line of said main frame, ground working implements disposed beneath said main frame at one side of the center line thereof, and having beams disposed in said suspended frame, a pull connection extending from said beams at a point substantially toward the rear end thereof to the lower end of said suspended frame, a fixture on said main frame disposed substantially centrally thereof and forwardly of said suspended frame, and means connecting said suspended frame to said main frame, and means on said main frame connected to said beams adapted to raise and lower the same out of and into engagement with the ground.

12. In a machine of the character described, a main frame, a transverse axle having projecting wheel spindles at each side of said frame, a pair of side wheels mounted on said spindles, a guide wheel, ground engaging implements, means supporting said implements from said axle, a fixture on said main frame disposed substantially centrally thereof and forwardly of said axle, and a pull connection extending between said supporting means and said fixture.

13. In a machine of the character described, a main frame, a transverse axle having projecting wheel spindles at each side of said frame, a pair of side wheels mounted on said spindles, a guide wheel, ground engaging implements, means supporting said implements from said axle, and movable longitudinally relatively to said axle, a fixture on said main frame disposed substantially centrally thereof and forwardly of said axle, and a pull connection extending between said supporting means and said fixture.

14. In a machine of the character described, a frame, side wheels therefor, ground working implements disposed beneath said frame and having beams supported beneath said frame, and a pull connection extending from a point substantially toward the rear ends of said beams to a point of said frame substantially forwardly thereof.

In testimony that they claim the foregoing as their invention, they have signed their names hereunder.

FREDERICK L. SCHLEY.
CLEMENS ERNST.